US011970006B2

(12) United States Patent
Katano et al.

(10) Patent No.: US 11,970,006 B2
(45) Date of Patent: Apr. 30, 2024

(54) LIQUID CONTAINER

(71) Applicant: CANON KABUSHIKI KAISHA, Tokyo (JP)

(72) Inventors: Yu Katano, Kanagawa (JP); Hirofumi Ota, Kanagawa (JP); Ken Ikegame, Kanagawa (JP); Yasuto Kodera, Kanagawa (JP); Masao Furukawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 109 days.

(21) Appl. No.: 17/882,472

(22) Filed: Aug. 5, 2022

(65) Prior Publication Data

US 2023/0046404 A1 Feb. 16, 2023

(30) Foreign Application Priority Data

Aug. 16, 2021 (JP) ................................ 2021-132339

(51) Int. Cl.
*B41J 2/175* (2006.01)

(52) U.S. Cl.
CPC .. *B41J 2/17513* (2013.01); *B41J 2002/17516* (2013.01)

(58) Field of Classification Search
CPC .......... B41J 2/17513; B41J 2002/17516; B41J 2/17553
See application file for complete search history.

(56) References Cited

U.S. PATENT DOCUMENTS 6,421,623 B1 7/2002 Furukawa et al. ........ B41J 2/195
8,608,299 B1 * 12/2013 Lu ........................ B41J 2/17506 347/86
2014/0253644 A1 * 9/2014 Shimizu ............... B41J 2/17509 347/85
2020/0307234 A1 10/2020 Katsuki
2021/0268801 A1 9/2021 Katano ..................... B41J 2/175
2021/0268802 A1 9/2021 Ikegame .................. B41J 2/175

FOREIGN PATENT DOCUMENTS

JP 2020-157562 10/2020

OTHER PUBLICATIONS

U.S. Appl. No. 17/746,828, filed May 17, 2022.

* cited by examiner

*Primary Examiner* — Thinh H Nguyen
(74) *Attorney, Agent, or Firm* — Venable LLP

(57) ABSTRACT

The object is to provide a liquid container that can prevent foreign substances from flowing into a liquid ejection apparatus with a simple configuration. The liquid container for containing liquid to be ejected by a liquid ejection apparatus includes: a bag body configured to contain the liquid inside; and a flow path for supplying the liquid contained inside the bag body to the liquid ejection apparatus, wherein, inside a peripheral wall of the flow path, a first capturing unit extending in an anti-gravitational direction and a second capturing unit extending in a gravitational direction are arranged at different positions with respect to a direction in which the liquid flows.

13 Claims, 14 Drawing Sheets

LIQUID CONTAINER

BACKGROUND

Field of the Disclosure

The present disclosure relates to a liquid container.

Description of the Related Art

In Japanese Patent Laid-Open No. 2020-157562, there is described a liquid container including a filter in a bag so as to be thereby capable of removing substances unnecessary for recording, such as foreign substances and bubbles (hereinafter also referred to as unnecessary substances). Specifically, the liquid container of Patent Literature 1 has a configuration in which a filter unit is connected in the middle of a flow path for supplying the liquid from the bag to the recording apparatus and in which unnecessary substances are filtered and removed from the liquid supplied to the recording apparatus. With the liquid container according to Japanese Patent Laid-Open No. 2020-157562, since the liquid is filtered by the filter, even if the liquid container contains foreign substances or bubbles, it is possible that the foreign substances are prevented from being mixed and reaching the liquid injection apparatus (hereinafter also referred to as the liquid ejection apparatus), and thus deterioration of image quality can be reduced.

However, with the liquid container described in Patent Literature 1, since it is necessary to install a dedicated filter structure in the middle of the liquid path, the number of components configuring the liquid container increases, and the liquid container itself must be large.

Accordingly, the object of the present disclosure is to provide a liquid container that can prevent foreign substances from flowing into a liquid ejection apparatus with a simple configuration.

SUMMARY

To achieve such an object, the liquid container of the present disclosure is a liquid container for containing liquid to be ejected by a liquid ejection apparatus, the liquid container including: a bag body configured to contain the liquid inside; and a flow path for supplying the liquid contained inside the bag body to the liquid ejection apparatus, wherein, inside a peripheral wall of the flow path, a first capturing unit extending in an anti-gravitational direction and a second capturing unit extending in a gravitational direction are arranged at different positions with respect to a direction in which the liquid flows.

Further features of the present invention will become apparent from the following description of exemplary embodiments with reference to the attached drawings.

DESCRIPTION OF THE EMBODIMENTS

Hereinafter, with reference to the attached drawings, the present invention is explained in detail in accordance with preferred embodiments. Configurations shown in the following embodiments are merely exemplary and the present invention is not limited to the configurations shown schematically.

First Embodiment

<<About the Liquid Ejection Apparatus 1>>

Figure 1:
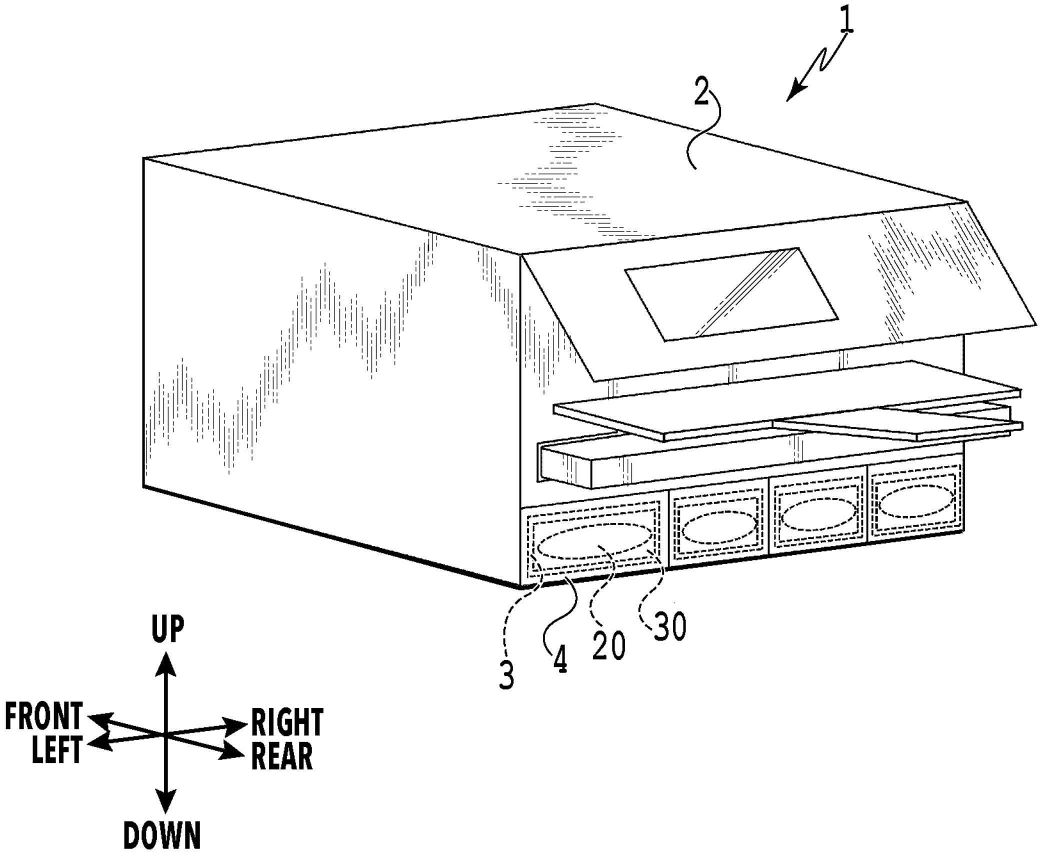
FIG. 1 is a perspective view of a liquid ejection apparatus.

FIG. 1 is a perspective view of the liquid ejection apparatus 1 in which the liquid container 20 according to the present disclosure is housed. As illustrated in FIG. 1, the liquid ejection apparatus 1 includes the housing 2 which is in an approximately rectangular parallelepiped shape, a liquid ejection head (not illustrated in the drawing) installed in the housing 2, the mounting part 3, the cover 4, and the case 30. The case 30 includes a housing part for housing the liquid container 20. Further, the liquid container 20 which contains the liquid to be supplied to the liquid ejection head is detachably housed in the housing part.

Examples of the liquid ejection apparatus 1 include an inkjet recording apparatus that ejects ink as a liquid from a liquid ejection head to record an image on a recording medium (not illustrated in the drawing). Further, the liquid ejection head may be a serial head that reciprocates in a direction intersecting the conveyance direction of the recording medium and may be a line head that does not reciprocate and is fixed to the main body of the apparatus.

Further, the case 30 can be mounted on the mounting part 3 even in a state where the liquid container 20 is not housed. As for the mounting part 3 according to the present embodiment, there are multiple (four in the illustrated example) mounting parts installed side by side in the width direction of the housing 2. Further, the cover 4 that covers the mounting part 3 in an openable manner is installed at the opening portion of the mounting part 3.

Further, the liquid container 20 configures the liquid containing unit 10 (see FIG. 2) together with the case 30 and is mounted in a removable manner by being inserted into the mounting part 3, which opens in the front surface of the housing 2, in a state of being housed in the case 30.

Further, the liquid ejection apparatus 1 includes a pump mechanism (not illustrated in the drawing) for suctioning the liquid from the liquid container 20, so that the liquid inside the liquid container 20 is sucked into the liquid ejection apparatus 1 due to the negative pressure generated by the suctioning of the pump mechanism.

<<About the Dimensions>>

In the following explanation, regarding the dimensions in the drawings, the direction in which the liquid containing unit 10 is inserted to the liquid ejection apparatus 1 is referred to as "front", and the direction in which the liquid containing unit 10 is withdrawn from the liquid ejection apparatus 1 is referred to as "rear". Further, with respect to the direction in which the liquid containing unit 10 is inserted to the liquid ejection apparatus 1, the left side is referred to as "left" and the opposite side of the left side is referred to as "right". Further, with respect to the gravitational direction, the anti-gravitational direction is referred to as "up" and the gravitational direction is referred to as "down".

<<About the Liquid Container 20>>

Figure 2:
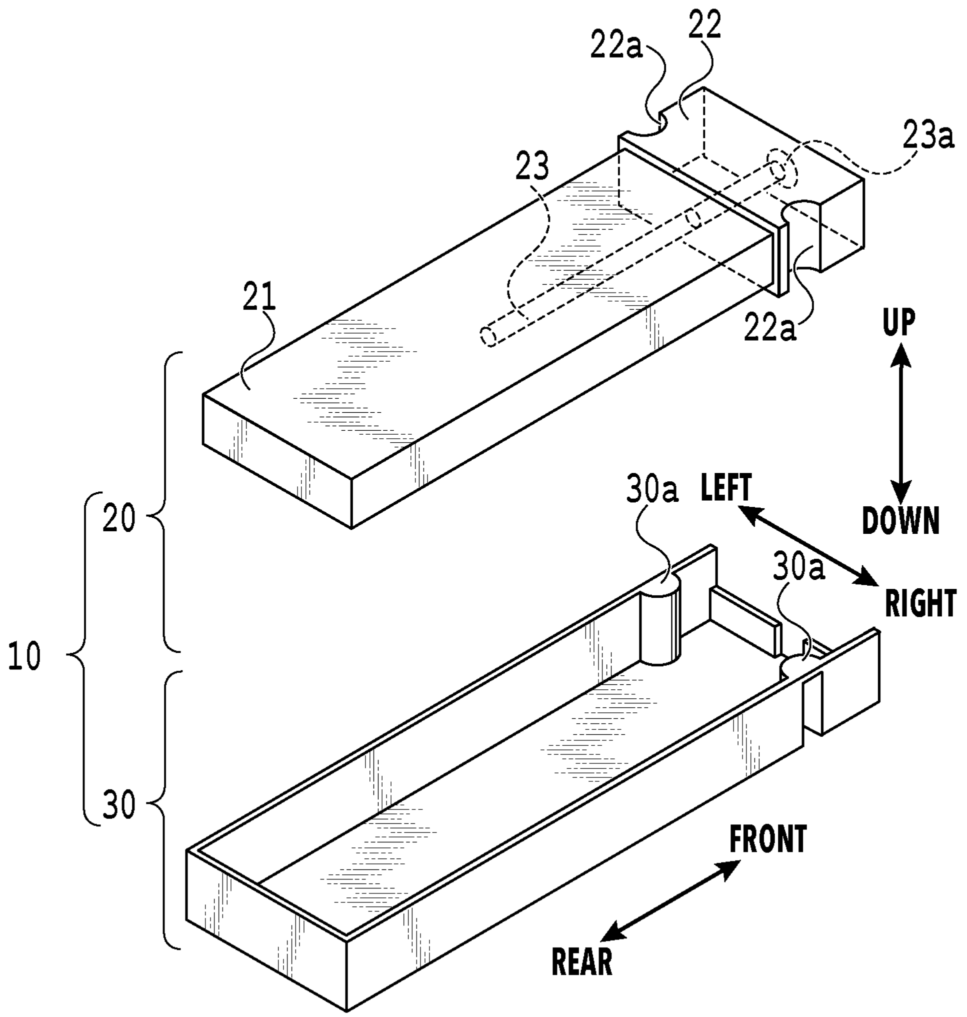
FIG. 2 is a perspective view illustrating a liquid containing unit.

FIG. 2 is a perspective view of the liquid containing unit 10. As illustrated in FIG. 2, the liquid containing unit 10 includes the liquid container 20 and the case 30. In the present drawing, the state where the liquid container 20 has been removed from the case 30 is illustrated. At the time of usage, the liquid container 20 is set in the case 30 and integrated.

The liquid container 20 includes the bag body 21, the adapter 22, and the liquid supply part 23 that is equipped with the liquid deriving port 23*a*. The bag body 21 contains a liquid inside. Examples of the liquid contained in the bag body 21 include ink and the like. Although the example in which a pigment ink is contained in the bag body 21 is explained in the present embodiment, the liquid contained in the bag body 21 does not have to be the pigment ink.

Further, the bag body 21 has flexibility and gas barrier property. The shape of the bag body 21 may be a pillow type or a gusset type. Note that the explanation below is continued on the premise that the bag body 21 according to the present embodiment is a pillow type bag formed by stacking two rectangular films and joining the peripheral parts thereof to each other.

As the films that configure the bag body 21, a material having the above-described flexibility and gas barrier property is used. For example, examples of the material for the films include polyethylene terephthalate (PET), nylon, polyethylene, etc.

Further, it is also possible that one bag body 21 is formed by using a laminate structure in which multiple films configured of the above-described material are laminated. In such a laminate structure, for example, the outer layer may be formed of PET or nylon having excellent impact resistance, and the inner layer may be formed of polyethylene having excellent ink resistance.

Further, a film having a layer on which aluminum or the like is deposited may be used as one constituent member of the laminate structure. Further, in the bag body 21, the adapter 22 for supplying the ink in the bag body 21 to the liquid ejection apparatus 1 is attached to an end part located on the front edge.

Further, the bag body 21 is sandwiched by an upper member constituting the adapter 22 and a lower member (not illustrated in the drawing), so as to be fixed. The adapter 22 has a function of connecting the liquid container 20 to the liquid ejection apparatus 1. Further, the adapter 22 has the bottom surface part, the top surface part having the same shape as the bottom surface part and installed so as to face the bottom surface part, the front surface part in which the liquid deriving port 23*a* is arranged, the rear surface part installed so as to face the front surface part, and the side surface parts respectively installed on the left and right of the adapter 22.

The liquid container 20 is housed so that the bottom surface part of the adapter 22 and the bottom surface part of the case 30 correspond to each other. Further, in a case where the liquid container 20 is housed in the case 30, the concave parts 22*a* on the side surface parts of the liquid container 20 are engaged with the convex parts 30*a* formed inside the side surfaces of the case 30. Then, if the liquid container 20 is housed in the case 30, the height of the upper surface part of the adapter 22 approximately matches the height of the opening surface of the case 30, so that they are located at almost the same height.

If the above-described pump mechanism is activated, the liquid contained in the bag body 21 is supplied from the liquid deriving port 23*a*, which is located at the tip of the liquid supply part 23, to the liquid ejection apparatus 1 via the liquid supply part 23 that penetrates from the inside of the bag body 21 to the front surface of the adapter 22. That is, the liquid supply part 23 functions as a flow path for letting the liquid flow from the rear to the front of the liquid container 20. Further, at the time of welding the peripheral edge part of the bag body 21, the liquid supply part 23 is sandwiched between the bag body 21, so as to be fixed to the bag body 21.

<<About the Liquid Supply Part 23>>

Figure 3A:
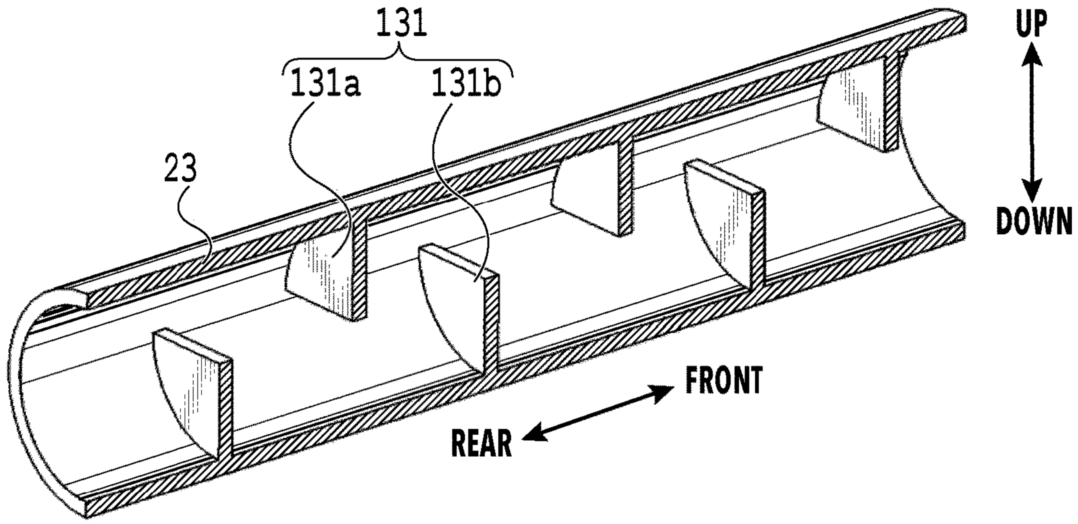
FIG. 3A is a perspective cross-sectional view illustrating the internal structure of a liquid supply part which configures a liquid container shown in the first embodiment.
Figure 3B:
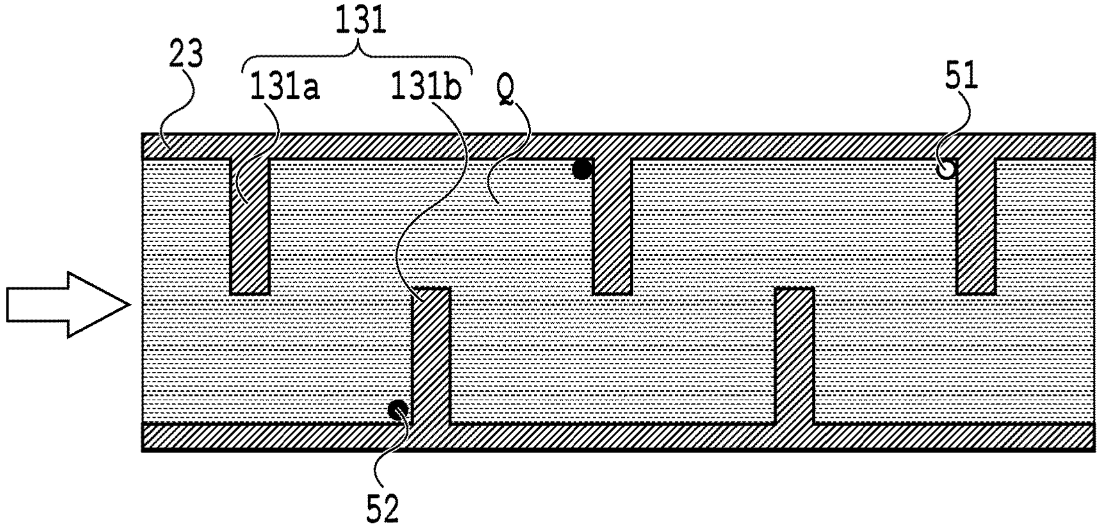
FIG. 3B is a side cross-sectional view illustrating a state in which unnecessary substances are captured by the liquid supply part.

FIG. 3A and FIG. 3B are conceptual diagrams illustrating the inside of the liquid supply part 23 according to the present embodiment. FIG. 3A is a cross-sectional view schematically illustrating the left half of the liquid supply part 23 which is sectioned with respect to the direction in which the liquid flows. Further, FIG. 3B is a schematic side cross-sectional view of the liquid supply part 23. Note that, although the bubble 51 and the foreign substance 52 are assigned with different signs for convenience of explanation in the present specification, even a simple description as a "foreign substance" in the present specification refers to a concept that also includes a "bubble".

As illustrated in FIG. 3A, the liquid supply part 23 includes the first wall part 131*a* and the second wall part 131*b* as the capturing unit 131 for capturing foreign substances in the liquid.

Inside the liquid supply part 23, the first wall part 131*a* extends in a direction approximately perpendicular to the peripheral wall of the liquid supply part 23 from the upper surface of the peripheral wall of the liquid supply part 23 toward the internal center of the liquid supply part 23. Inside the liquid supply part 23, the second wall part 131*b* extends in a direction approximately perpendicular to the peripheral wall of the liquid supply part 23 from the lower surface of the peripheral wall of the liquid supply part 23 toward the internal center of the liquid supply part 23. Further, the first wall part 131*a* and the second wall part 131*b* are alternately arranged at different positions with respect to the direction in which the liquid flows (that is, from the rear to the front of the liquid supply part 23).

That is, inside the peripheral wall of the liquid supply part 23, the second wall part 131*b* extending in the anti-gravitational direction with respect to the central position of the liquid flow and the first wall part 131*a* extending in the gravitational direction with respect to the central position of the liquid flow are arranged at different positions with respect to the direction in which the liquid flows.

The liquid supply part 23 is easily manufactured, for example, by joining the half-split bodies having the shape illustrated in FIG. 3A. Examples of the method for joining half-split bodies include welding (for example, thermal welding or ultrasonic welding), adhesion with an adhesive agent, etc.

In the example according to the present embodiment, if the half-split bodies illustrated in FIG. 3A are joined to each other, one liquid supply part 23 is formed. Here, since the shape of each of the first wall part 131*a* and the second wall part 131*b* included in the half-split bodies of the liquid supply part 23 is a sectorial flat plate shape formed by splitting a circular flat plate crosswise into four sections, the capturing unit 131 in the semicircular shape is formed if the above-described half-split bodies are joined to each other. Further, the capturing unit 131 in the semicircular shape captures the bubble 51 and the foreign substance 52 contained in the liquid flowing inside the liquid supply part 23 (that is, inside the flow path through which the ink flows).

Hereinafter, a brief explanation will be given of the capturing of the bubble 51 and the foreign substance 52. First, if the pump mechanism included in the above-described liquid ejection apparatus 1 operates and starts suctioning the liquid in the liquid container 20, the liquid Q inside the liquid supply part 23 flows in the direction of the arrow illustrated in FIG. 3B. Hereinafter, the left side in FIG. 3B (that is, the rear side in FIG. 3A) is referred to as "upstream" and the right side (that is, the front side in FIG. 3A) is referred to as "downstream" as appropriate.

Subsequently, if the liquid Q hits the capturing unit 131, the flow of the liquid Q is suppressed. Here, if the liquid Q contains the bubble 51 and the foreign substance 52, the bubble 51 and the foreign substance 52 will be captured by the capturing unit 131.

Regarding the capturing of the bubble 51 and the foreign substance 52, the specific gravity of the bubble 51 is generally lighter than that of the liquid Q. Therefore, it is likely that the bubble 51 is captured by the first wall part 131*a* which is formed on the upper surface side of the liquid supply part 23. On the other hand, the specific gravity of the foreign substance 52 is generally considered to be heavier than that of the liquid Q. Therefore, it is likely that the foreign substance 52 is captured by the second wall part 131*b* which is formed on the lower surface side of the liquid supply part 23. Needless to say, it is also possible that the bubble 51 is captured by the second wall part 131*b* which is formed on the lower surface side of the liquid supply part 23. On the contrary, it is also possible that the foreign substance 52 is captured by the first wall part 131*a* which is formed on the upper surface side of the liquid supply part 23. The above is a brief explanation of the capturing of the bubble 51 and the foreign substance 52.

By the way, in a case where the liquid Q contains a substance which has a heavier specific gravity than that of the liquid Q and has to be supplied to the liquid ejection apparatus 1, the substance may be captured by the second wall part 131*b*. However, even in this case, if the size of the substance is small enough to be swirled up by the flow of the liquid Q, no particular problem will occur. Hereinafter, the case where the liquid Q is a pigment ink that contains a pigment having a heavier specific gravity than the liquid Q will be taken as an example for the explanation.

First, if the liquid Q hits the second wall part 131*b*, a turbulent flow occurs in the vicinity of the second wall part 131*b*. Subsequently, the pigment that has precipitated on the lower surface side of the liquid supply part 23 is swirled up and stirred by the turbulent flow. Subsequently, the stirred pigment is supplied to the liquid ejection apparatus 1 on the flow of the liquid flowing in the vicinity of the center of the liquid supply part 23.

Therefore, even if the pigment is captured by the second wall part 131*b*, it is unlikely that the pigment will continue to stagnate in that place. Thus, the liquid supply part 23 according to the present embodiment can supply the pigment to the liquid ejection apparatus 1 while capturing the foreign substance 52 having a heavier specific gravity than the liquid by using the second wall part 131*b*. Therefore, no problem arises. The above is the explanation of the reason why there is no problem even if the second wall part 131*b* captures the pigment.

On the other hand, the foreign substance 52 assumed in the present embodiment is a large particle that is hardly swirled up by the flow of the liquid Q. Thus, even if the foreign substance 52 is swirled up by the flow of the liquid Q and gets over the first second wall part 131*b*, there is a high possibility that the foreign substance 52 will be captured by the second wall part 131*b*. Therefore, it is preferable that multiple second wall parts 131*b* are formed in the direction of the flow of the liquid Q. Needless to say, for the same reason, it is preferable that multiple first wall parts 131*a* are also formed in the direction of the flow of the liquid Q.

<<Manufacturing Method of the Liquid Supply Part 23>>

Hereinafter, an explanation will be given of the liquid supply part 23. Note that, in the following explanation, the symbol "S" represents a step. In S1, either the left or right half-split body of the liquid supply part 23 is injection-molded. In S2, the other half-split body of the liquid supply part 23 is injection-molded. In S3, both the left and right half-split bodies of the liquid supply part 23 are joined to each other with their joint surfaces aligned.

Through the above steps, the liquid supply part 23 according to the present embodiment can be manufactured. Note that, although the example of joining the left and right half-split bodies to each other is shown in the above-described example, it is also possible that upper and lower half-split bodies are joined to each other by the above-described method.

<<Conclusion>>

According to the liquid container 20 according to the present embodiment, the bubble 51 and the foreign substance 52 can be captured without using a filter unit attached to the outside of the liquid supply part 23 or to the middle of a path thereof. That is, according to the liquid container 20 of the present disclosure, it is possible to prevent the bubble 51 and the foreign substance 52 from being mixed into the liquid ejection apparatus 1 with a simple configuration.

Second Embodiment

In the present embodiment, the object is to make it easier to capture the bubble 51 and the foreign substance 52. Although the capturing unit 131 is formed in the approximately perpendicular direction inside the liquid supply part 23 in the first embodiment, the present embodiment is different in the aspect that the walls are formed diagonally inside the liquid supply part 23. Hereinafter, an explanation will be given of the present embodiment with reference to FIG. 4A and FIG. 4B. The following explanation focuses on the aspects that are different from the first embodiment, and the same configurations as those of the first embodiment are assigned with the same signs so that the explanations thereof are omitted.

Figure 4A:
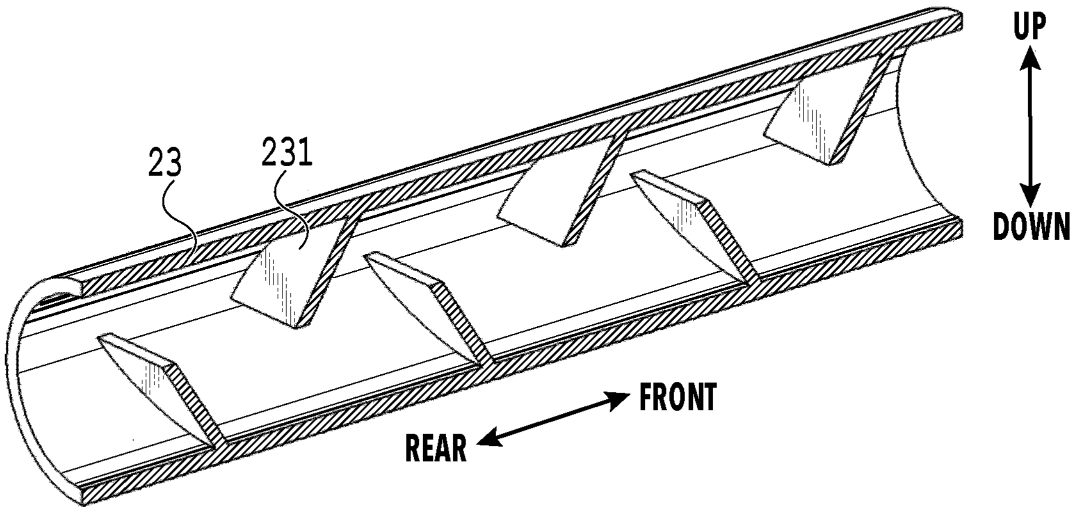
FIG. 4A is a perspective cross-sectional view illustrating the internal structure of a liquid supply part which configures a liquid container shown in the second embodiment.
Figure 4B:
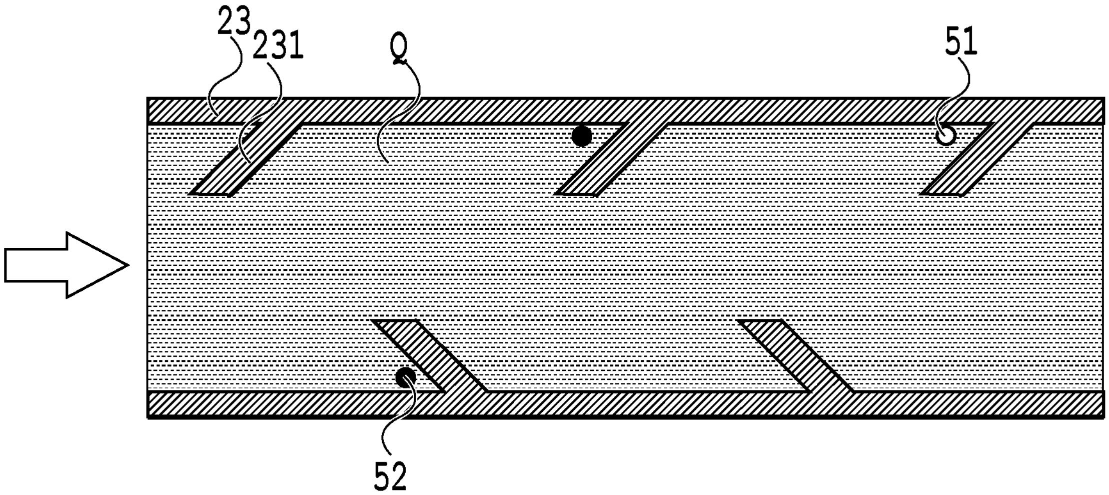
FIG. 4B is a side cross-sectional view illustrating a state in which unnecessary substances are captured by the liquid supply part.

FIG. 4A and FIG. 4B are conceptual diagrams illustrating the inside of the liquid supply part 23 according to the present embodiment. FIG. 4A is a conceptual diagram schematically illustrating the left half of the liquid supply part 23 with respect to the direction in which the liquid flows.

Further, FIG. 4B is a schematic cross-sectional view of the liquid supply part 23. As illustrated in FIG. 4A, the wall as the second capturing unit 231 forms an acute angle with the surface that receives the flow of the liquid Q and the peripheral wall of the liquid supply part 23. In other words, regarding each second capturing unit 231, comparing the center side of the liquid supply part 23 and the root side of the liquid supply part 23, the inclination of each second capturing unit 231 is formed so that the distance of the center side to the intake port (not illustrated in the drawing) for taking the liquid Q into the liquid supply part 23 is shorter. That is, as illustrated in FIG. 4B, the crown part of the second capturing unit 231 is formed diagonally in the direction opposite to the direction of the flow of the liquid Q.

Therefore, since the crown part of the second capturing unit 231 is inclined in the direction opposite to the direction of the flow of the liquid Q, it is possible to make it difficult for the captured bubble 51 and foreign substance 52 to flow again as compared with the first embodiment, and thus higher catchability can be obtained. Thereby, according to the present embodiment, the bubble 51 and the foreign substance 52 can be captured more effectively.

Third Embodiment

In the present embodiment, the object is to facilitate the flow of the liquid Q while capturing the bubble 51 and the foreign substance 52. The difference between the first embodiment and the present embodiment is the presence or absence of a slope for facilitating the flow of the liquid Q. Hereinafter, an explanation will be given of the present embodiment with reference to FIG. 5A and FIG. 5B. The following explanation focuses on the aspects that are different from the first embodiment, and the same configurations as those of the first embodiment are assigned with the same signs so that the explanations thereof are omitted.

Figure 5A:
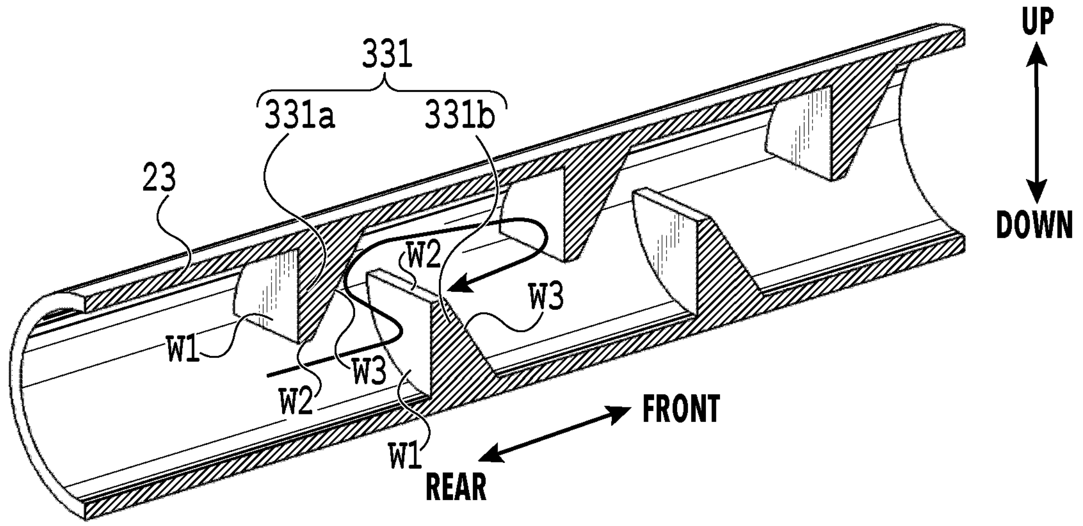
FIG. 5A is a perspective cross-sectional view illustrating the internal structure of a liquid supply part which configures a liquid container shown in the third embodiment.
Figure 5B:
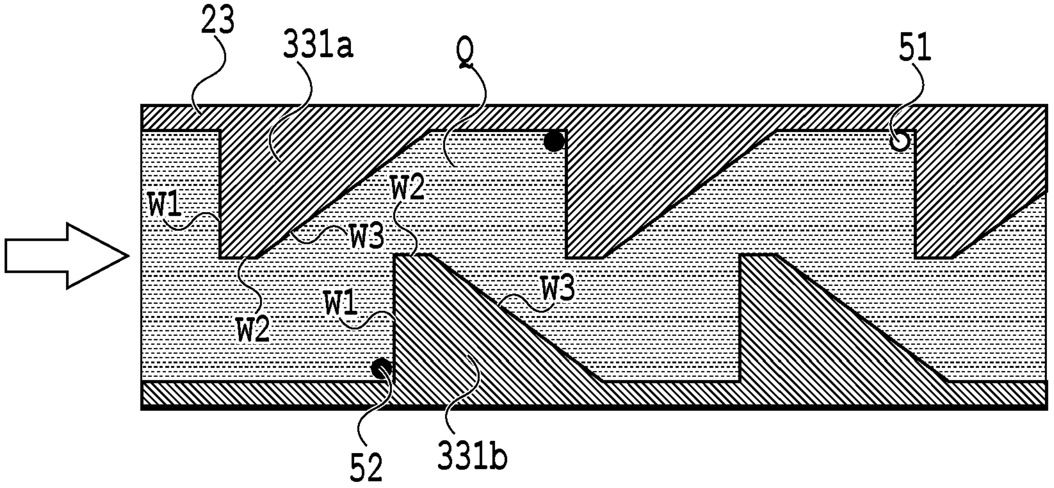
FIG. 5B is a side cross-sectional view illustrating a state in which unnecessary substances are captured by the liquid supply part.

FIG. 5A and FIG. 5B are conceptual diagrams illustrating the inside of the liquid supply part 23 according to the present embodiment. FIG. 5A is a conceptual diagram schematically illustrating the left half of the liquid supply part 23 with respect to the direction in which the liquid Q flows.

As illustrated in FIG. 5A, the third capturing unit 331 includes the wall surface parts W1 extending in an approximately perpendicular direction from the peripheral wall of the liquid supply part 23 toward the internal center of the liquid supply part 23. Further, the third capturing unit 331 includes the flat surface parts W2 extending approximately horizontally from the crown parts of the wall surface parts W1 toward the front of the liquid supply part 23. Furthermore, the third capturing unit 331 includes the slope surface parts W3 extending further forward from the front ends of the flat surface parts W2 and toward the peripheral wall of the liquid supply part 23.

Note that, in a case where the third capturing unit 331 does not include the flat surface parts W2, the slope surface parts W3 extend further forward from the crown parts of the wall surface parts W1 and toward the peripheral wall of the liquid supply part 23. In other words, the slope surface parts W3 extend diagonally from the peripheral wall of the liquid supply part 23 toward the internal center of the liquid supply part 23 in the direction opposite to the direction of the flow of the liquid Q (that is, from the front to the rear of the liquid supply part 23).

FIG. 5B is a schematic cross-sectional view of the liquid supply part 23. The shape of the cross-sectional view of each third capturing unit 331 formed inside the liquid supply part 23 is a trapezoid. Note that, in a case where the third capturing unit 331 does not include the flat surface parts W2, the shape of the cross-sectional view of each third capturing unit 331 should be an approximately right triangle. Therefore, the shape of the third capturing unit 331 is asymmetric with respect to the front-rear direction of the liquid supply part 23.

As illustrated in FIG. 5B, the wall surface parts W1 of the third capturing unit 331 can be used to capture the bubble 51 and the foreign substance 52 in the same manner as in the first embodiment. Hereinafter, the capturing of the bubble 51 and the foreign substance 52 and the flowing manner of the liquid Q according to the present embodiment will be explained with reference to FIG. 5B.

First, it is assumed that the liquid Q has hit the wall surface part W1 of the first third wall part 331*b* located on the leftmost of the drawing (that is, in the rear of the liquid supply part 23). Then, the liquid Q that hit the wall surface part W1 of the third wall part 331*b* will hit the slope surface part W3 of the first fourth wall part 331*a* located on the leftmost of the drawing (that is, in the rear of the liquid supply part 23). Regarding the flow of the liquid Q, compared to the liquid Q hitting a wall surface extending in a direction approximately perpendicular to the peripheral wall, it is easier for the liquid Q to flow if it hits a slope surface inclined with respect to the peripheral wall because the resistance is smaller.

Subsequently, the liquid Q that hit the wall surface part W1 of the second fourth wall part 331_a_ will hit the slope surface part W3 of the first third wall part 331_b_, so that the liquid Q can flow more easily. Thereby, according to the present embodiment, it is possible to facilitate the flow of the liquid while capturing the bubble 51 and the foreign substance 52.

Note that, although the example in which the slope surface part W3 is formed in front of the third capturing unit 331 is shown as an example of the position where the slope surface part W3 is formed, it is also possible that the slope surface part W3 is formed in the left-right direction of the third capturing unit 331. That is, it is also possible that the shape of the third capturing unit 331 is as illustrated in FIG. 5B in a case where the inside of the liquid supply part 23 is viewed from the rear side.

With the configuration, although the bubble 51 and the foreign substance 52 flow to the front of the liquid supply part 23 from a part where the height of the wall surface part W1 is low, the area of the wall surface part W1 that is hit by the liquid Q can be made small, and thus the resistance to the flow of the liquid Q can be reduced accordingly. Note that the bubble 51 and the foreign substance 52 that have flown to the front of the liquid supply part 23 can be captured by using the third capturing unit 331 that is formed in a further front position inside the liquid supply part 23.

Fourth Embodiment

In the present embodiment, the object is to facilitate the flow of the liquid while capturing the bubble 51 and the foreign substance 52. The difference between the walls according to the first embodiment and the walls according to the present embodiment is the presence or absence of holes. In view of facilitating the flow of liquid while capturing the bubble 51 and the foreign substance 52, it is preferable that the walls have multiple regularly-arranged holes (that is, mesh-like holes) that are smaller than the bubble 51 and the foreign substance 52. Hereinafter, an explanation will be given of the present embodiment with reference to FIG. 6A and FIG. 6B. The following explanation focuses on the aspects that are different from the first embodiment, and the same configurations as those of the first embodiment are assigned with the same signs so that the explanations thereof are omitted.

Figure 6A:
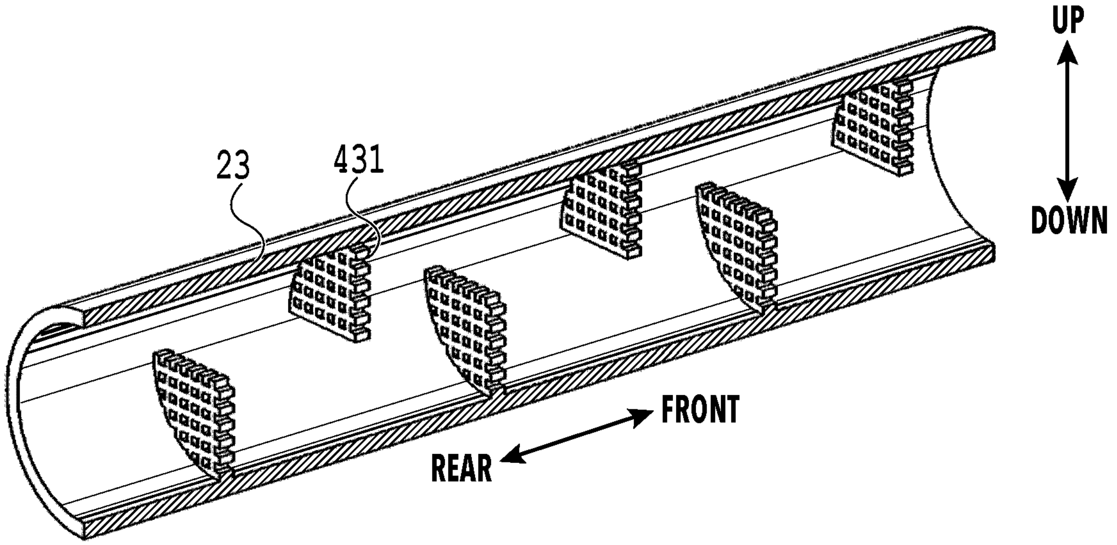
FIG. 6A is a perspective cross-sectional view illustrating the internal structure of a liquid supply part which configures a liquid container shown in the fourth embodiment.
Figure 6B:
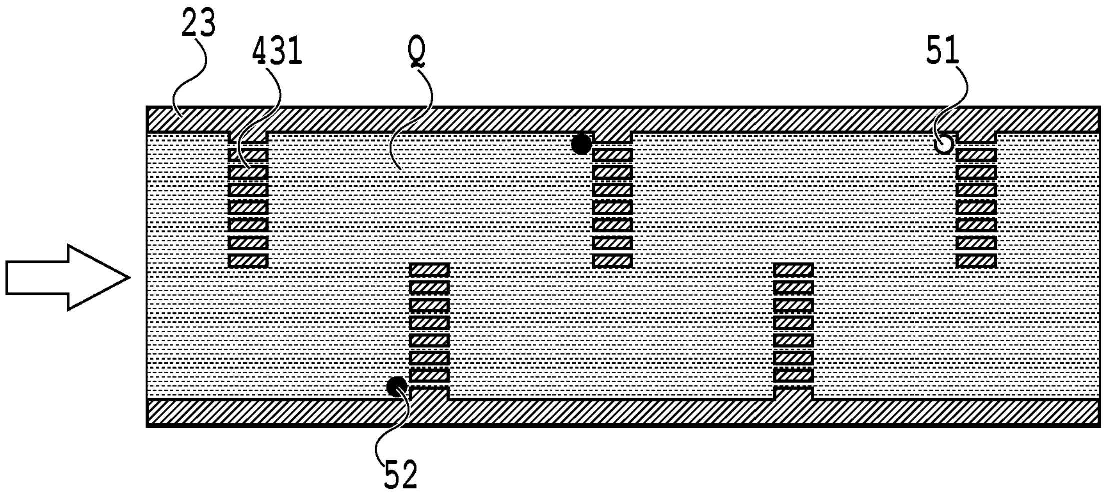
FIG. 6B is a side cross-sectional view illustrating a state in which unnecessary substances are captured by the liquid supply part.

FIG. 6A and FIG. 6B are conceptual diagrams illustrating the inside of the liquid supply part 23 according to the present embodiment. FIG. 6A is a conceptual diagram schematically illustrating the left half of the liquid supply part 23 with respect to the direction in which the liquid flows. Further, FIG. 6B is a schematic cross-sectional view of the liquid supply part 23. As illustrated in FIG. 6A, mesh-like holes are formed in the wall which is the fourth capturing unit 431 according to the present embodiment.

Further, as illustrated in FIG. 6B, the bubble 51 and the foreign substance 52 that are larger than the mesh-like holes (that is, the mesh) of the fourth capturing unit 431 are captured, and the flow of the liquid Q is not suppressed. Thereby, according to the present embodiment, it is possible to facilitate the flow of the liquid while capturing the bubble 51 and the foreign substance 52. Here, since the pigment component of a pigment ink has a particle size that is small enough as compared to foreign substances, the pigment component can easily pass through the mesh-like holes, and there is no hindrance to the supply of the ink.

Fifth Embodiment

In the present embodiment, the object is to capture the bubble 51 and the foreign substance 52 with a simpler configuration. Although the bubble 51 and the foreign substance 52 are blocked and captured by using the walls in the first embodiment, the present embodiment is different in the aspect that the bubble 51 and the foreign substance 52 are made to enter a groove and captured. Hereinafter, an explanation will be given of the present embodiment with reference to FIG. 7A and FIG. 7B. The following explanation focuses on the aspects that are different from the first embodiment, and the same configurations as those of the first embodiment are assigned with the same signs so that the explanations thereof are omitted.

Figure 7A:
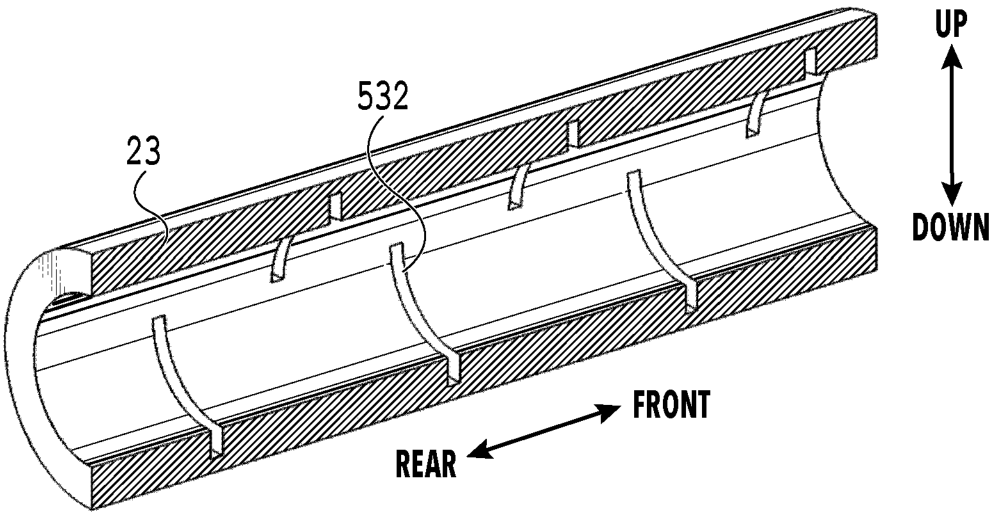
FIG. 7A is a perspective cross-sectional view illustrating the internal structure of a liquid supply part which configures a liquid container shown in the fifth embodiment.
Figure 7B:
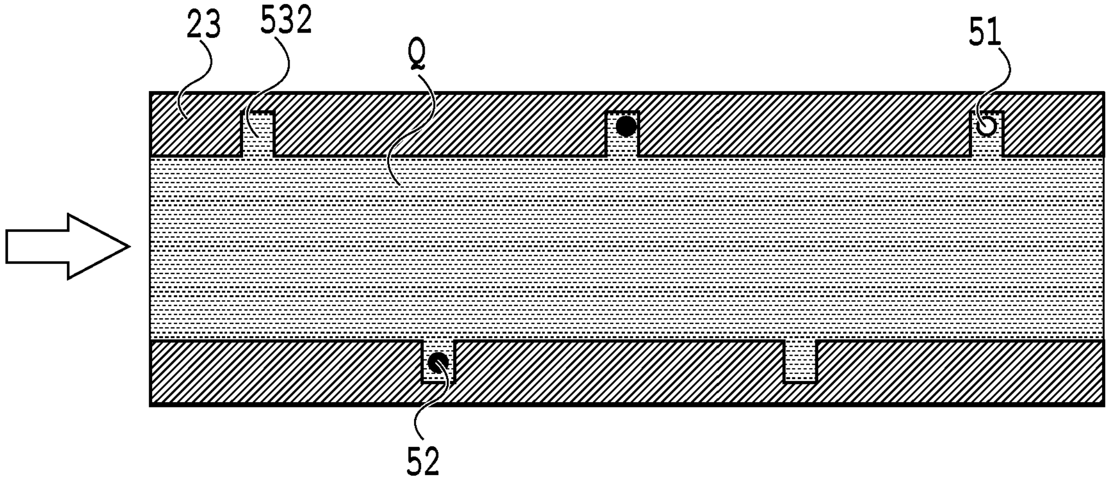
FIG. 7B is a side cross-sectional view illustrating a state in which unnecessary substances are captured by the liquid supply part.

FIG. 7A and FIG. 7B are conceptual diagrams illustrating the inside of the liquid supply part 23 according to the present embodiment. FIG. 7A is a conceptual diagram schematically illustrating the left half of the liquid supply part 23 with respect to the direction in which the liquid flows. Further, FIG. 7B is a schematic cross-sectional view of the liquid supply part 23.

As illustrated in FIG. 7A, a notch is made in a direction approximately perpendicular to the peripheral wall of the liquid supply part 23 according to the present embodiment from the inside toward the outside, so as to form the fifth capturing unit 532. That is, the fifth capturing unit 532 is a concave groove formed in the peripheral wall of the liquid supply part 23.

As illustrated in FIG. 7B, multiple concave parts that are recessed in a direction approximately perpendicular to the peripheral wall of the liquid supply part 23 according to the present embodiment from the inside toward the outside. In a case where the liquid Q is flowing in the direction of the arrow in FIG. 7B (that is, from the rear to the front in FIG. 7A), the flow velocity of the inside of the fifth capturing unit 532 is slower than that of the part where the fifth capturing unit 532 is not formed.

Therefore, if the bubble 51 and the foreign substance 52 enter the fifth capturing unit 532, the bubble 51 and the foreign substance 52 will stagnate in the fifth capturing unit 532. That is, if the bubble 51 and the foreign substance 52 enter the fifth capturing unit 532, the bubble 51 and the foreign substance 52 can be captured. Thereby, the bubble 51 and the foreign substance 52 can be captured with a simpler configuration.

Sixth Embodiment

In the present embodiment, the object is to make it easier to capture the bubble 51 and the foreign substance 52. Although the grooves are formed in the direction approximately perpendicular to the peripheral wall of the liquid supply part 23 in the fifth embodiment, the present embodiment is different in the aspect that the grooves are formed diagonally in the direction opposite to the direction of the flow of the liquid Q. Hereinafter, an explanation will be given of the present embodiment with reference to FIG. 8A and FIG. 8B. The following explanation focuses on the aspects that are different from the fifth embodiment, and the same configurations as those of the fifth embodiment are assigned with the same signs and the explanations thereof are omitted.

Figure 8A:
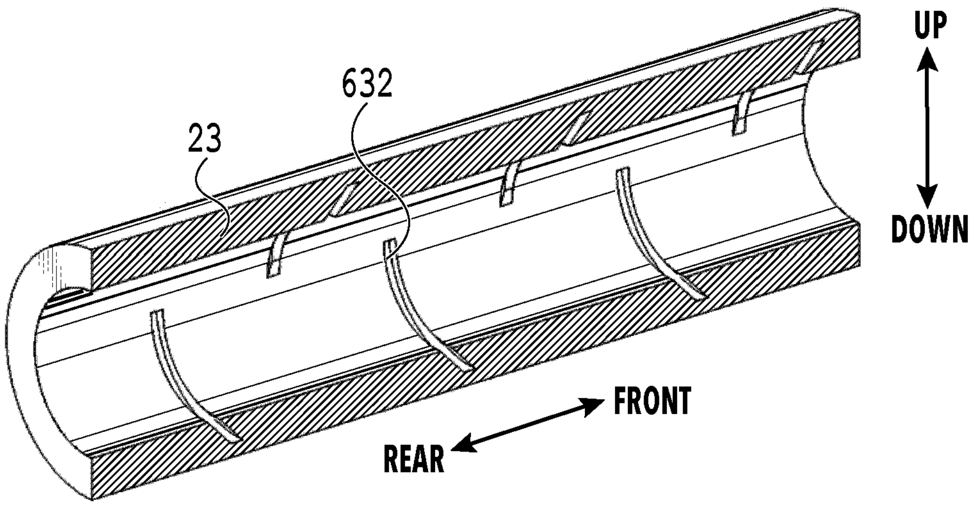
FIG. 8A is a perspective cross-sectional view illustrating the internal structure of a liquid supply part which configures a liquid container shown in the sixth embodiment.
Figure 8B:
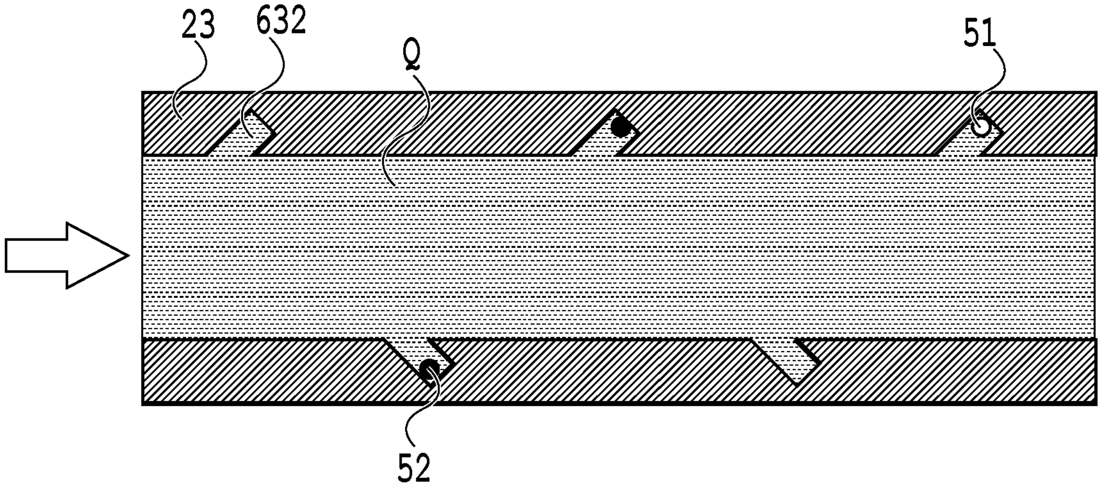
FIG. 8B is a side cross-sectional view illustrating a state in which unnecessary substances are captured by the liquid supply part.

FIG. 8A and FIG. 8B are conceptual diagrams illustrating the inside of the liquid supply part 23 according to the present embodiment. FIG. 8A is a conceptual diagram schematically illustrating the left half of the liquid supply part 23 with respect to the direction in which the liquid flows. Further, FIG. 8B is a schematic cross-sectional view of the liquid supply part 23.

As illustrated in FIG. 8A, the sixth capturing unit 632 is a concave groove which is made by diagonally notching the peripheral wall of the liquid supply part 23. The sixth capturing unit 632 is formed by making a notch in the peripheral wall of the liquid supply part 23 according to the present embodiment in a diagonal direction so that the bottom surface of the sixth capturing unit 632 faces the rear of the liquid supply part 23. That is, as illustrated in FIG. 8B, the sixth capturing unit 632 is formed by inclining the bottom surface part of the groove in the direction opposite to the direction of the flow of the liquid Q flowing in the liquid supply part 23.

Therefore, since the sixth capturing unit 632 is inclined in the direction opposite to the direction of the flow of the liquid Q, it is possible to make it difficult for the captured bubble 51 and foreign substance 52 to flow again as compared with the fifth embodiment, and thus higher catchability can be obtained. Thereby, according to the present embodiment, the bubble 51 and the foreign substance 52 can be captured more effectively.

Seventh Embodiment

In the present embodiment, the object is to make it easier to capture the bubble 51 and the foreign substance 52. The difference between the fifth capturing unit 532 according to the fifth embodiment and the seventh capturing unit 732 according to the present embodiment is the shape of the groove. Hereinafter, an explanation will be given of the present embodiment with reference to FIG. 9A and FIG. 9B. The following explanation focuses on the aspects that are different from the fifth embodiment, and the same configurations as those of the fifth embodiment are assigned with the same signs and the explanations thereof are omitted.

Figure 9A:
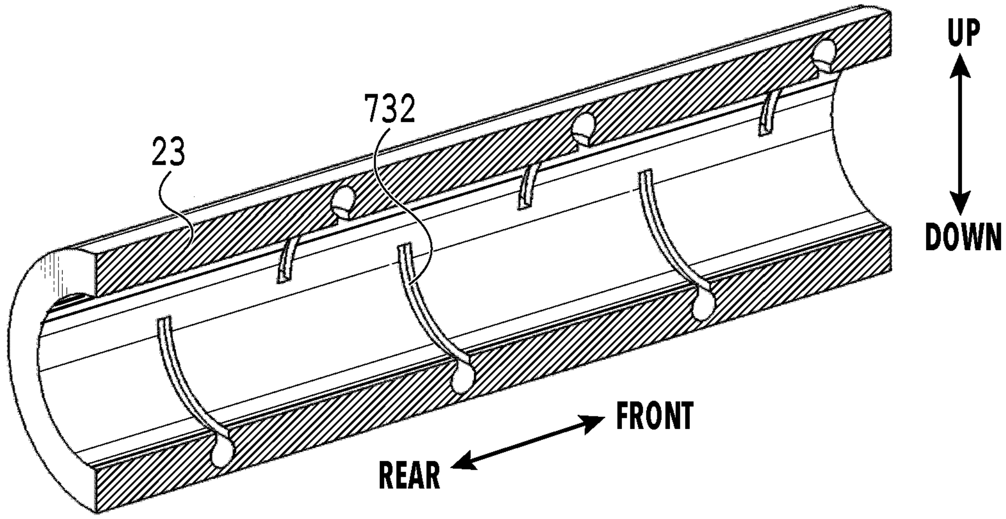
FIG. 9A is a perspective cross-sectional view illustrating the internal structure of a liquid supply part which configures a liquid container shown in the seventh embodiment.
Figure 9B:
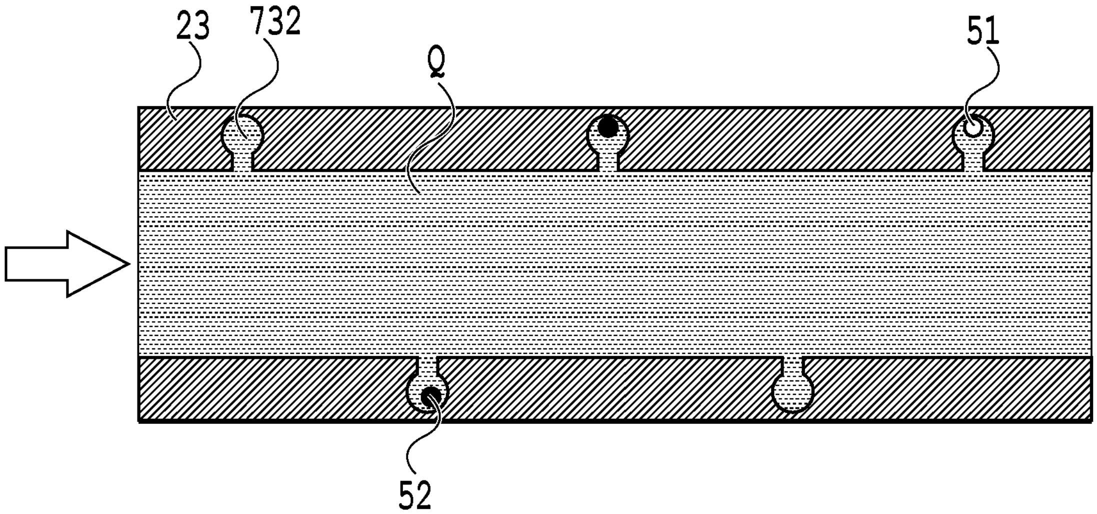
FIG. 9B is a side cross-sectional view illustrating a state in which unnecessary substances are captured by the liquid supply part.

FIG. 9A and FIG. 9B are conceptual diagrams illustrating the inside of the liquid supply part 23 according to the present embodiment. FIG. 9A is a conceptual diagram schematically illustrating the left half of the liquid supply part 23 with respect to the direction in which the liquid flows. Further, FIG. 9B is a schematic cross-sectional view of the liquid supply part 23. As illustrated in FIG. 9B, in the peripheral wall of the liquid supply part 23 according to the present embodiment, the seventh capturing unit 732 whose diameter increases from the inside to the outside of the peripheral wall is formed. For example, it is possible to use such a groove whose cross-sectional shape of the seventh capturing unit 732 is the keyhole shape illustrated in FIG. 9B.

Inside the peripheral wall of the liquid supply part 23, the groove according to the seventh capturing unit 732 expands in diameter from the inside to the outside of the peripheral wall. Therefore, it is difficult for the once-captured bubble 51 and foreign substance 52 to get out from the entrance of the seventh capturing unit 732. Therefore, according to the seventh capturing unit 732 according to the present embodiment, the bubble 51 and the foreign substance 52 can be captured more easily as compared with the fifth embodiment.

Eighth Embodiment

In the present embodiment, the object is to make it easier to capture the bubble 51 and the foreign substance 52 while ensuring the flowability of the liquid Q. The following explanation focuses on the aspects that are different from the first embodiment, and the same configurations as those of the first embodiment are assigned with the same signs so that the explanations thereof are omitted.

Figure 10A:
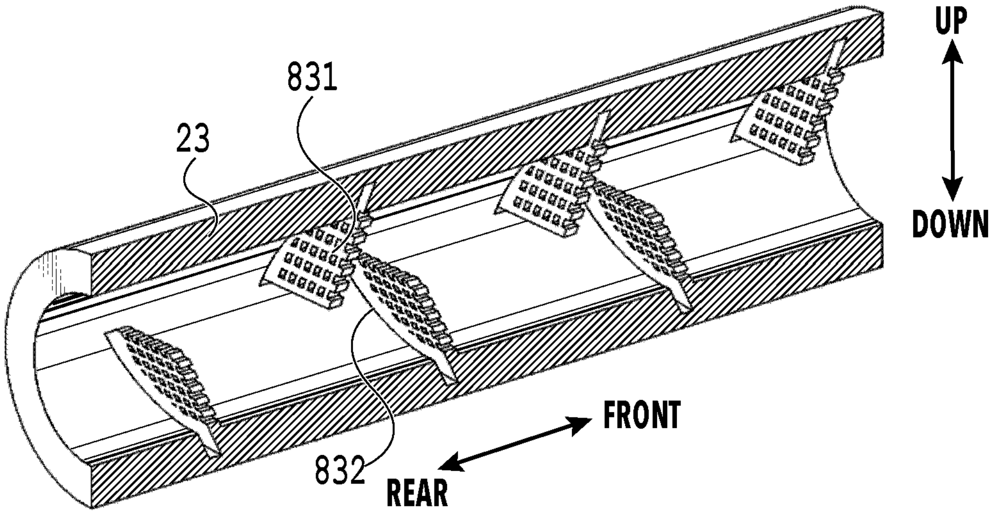
FIG. 10A is a perspective cross-sectional view illustrating the internal structure of a liquid supply part which configures a liquid container shown in the eighth embodiment.
Figure 10B:
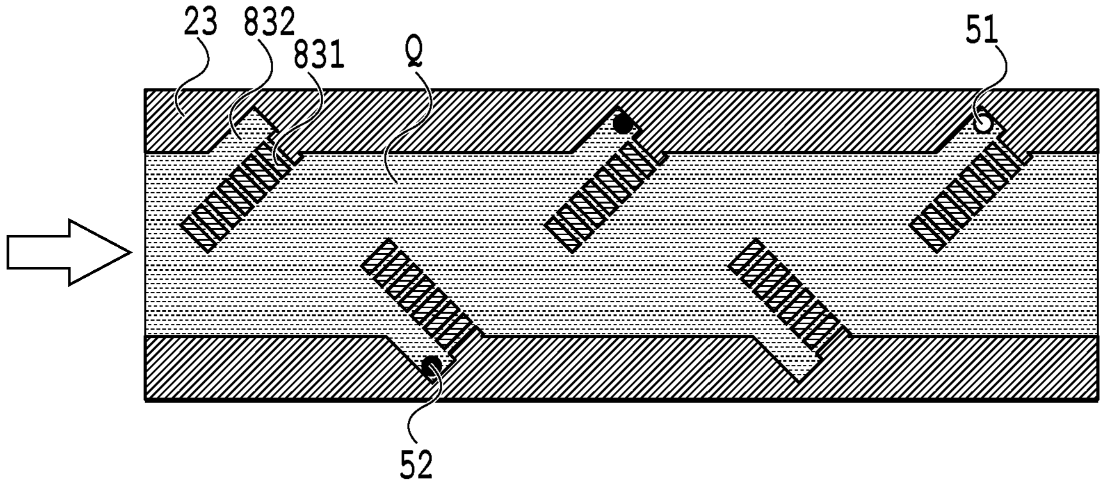
FIG. 10B is a side cross-sectional view illustrating a state in which unnecessary substances are captured by the liquid supply part.

FIG. 10A and FIG. 10B are conceptual diagrams illustrating the inside of the liquid supply part 23 according to the present embodiment. FIG. 10A is a conceptual diagram schematically illustrating the left half of the liquid supply part 23 with respect to the direction in which the liquid flows. Further, FIG. 10B is a schematic cross-sectional view of the liquid supply part 23. As illustrated in FIG. 10A, inside the liquid supply part 23, the eighth wall part 831 and the eighth groove part 832 are formed as the eighth capturing unit.

The eighth wall part 831 has at least one or more holes. In the example illustrated in FIG. 10A, the mesh-like holes are formed. Further, the eighth wall part 831 is formed diagonally so that the crown part of the wall is inclined in the direction opposite to the direction of the flow of the liquid Q. Further, the eighth groove part 832 adjacent to the eighth wall part 831 is formed in front of the eighth wall part 831 with respect to the direction of the flow of the liquid Q (that is, the rear side in FIG. 10A). In the example illustrated in FIG. 10A, the eighth groove part 832 is formed so as to be inclined at the same angle as the eighth wall part 831.

As illustrated in FIG. 10B, if the eighth wall part 831 has the mesh-like holes, the bubble 51 and foreign substance 52 that are larger than the size of the holes are captured, and the liquid Q can be passed through the holes. Further, regarding the eighth wall part 831, the eighth groove part 832 adjacent to the eighth wall part 831 is formed in front of the eighth wall part 831.

Therefore, if the bubble 51 and the foreign substance 52 hit the eighth wall part 831, the bubble 51 and the foreign substance 52 enter the eighth groove part 832 which is formed in front of the eighth wall part 831, and thus the bubble 51 and the foreign substance 52 will continue to stagnate in the eighth groove part 832. That is, it is possible to reduce the possibility that the bubble 51 and the foreign substance 52 that have entered the eighth groove 832 come out of the eighth groove part 832 and flow again, and thus the bubble 51 and the foreign substance 52 can be captured more effectively.

Therefore, according to the present embodiment, the flowability of the liquid Q can be ensured as compared with a wall with no holes. Further, the bubble 51 and the foreign substance 52 can be captured more effectively as compared with a wall and a groove formed to be approximately perpendicular to the liquid supply part 23.

Ninth Embodiment

In the present embodiment, the object is to capture the bubble 51 and the foreign substance 52 with a more inexpensive configuration. Although the shape of the liquid supply part 23 is cylindrical in the first embodiment, the liquid supply part 23 according to the present embodiment is different from the liquid supply part 23 according to the first embodiment in the aspect of having a rectangular tubular shape. The following explanation focuses on the aspects that are different from the first embodiment, and the same configurations as those of the first embodiment are assigned with the same signs so that the explanations thereof are omitted.

Figure 11:
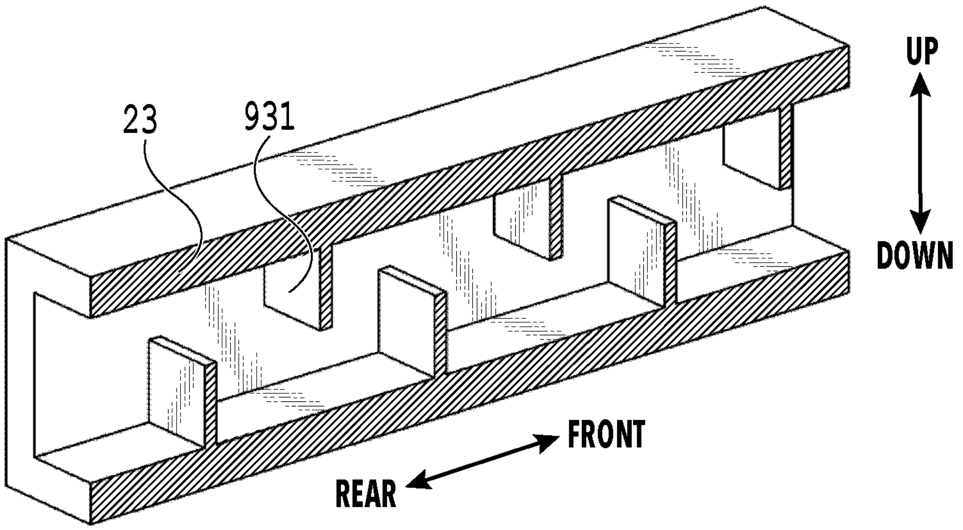
FIG. 11 is a perspective cross-sectional view illustrating the internal structure of a liquid supply part which configures a liquid container shown in the ninth embodiment.

FIG. 11 is a conceptual diagram illustrating the inside of the liquid supply part 23 according to the present embodiment. As illustrated in FIG. 11, the liquid supply part 23 according to the present embodiment has a rectangular tubular shape. Further, the shape of the wall of the ninth capturing unit 931 is also formed to be quadrangular in accordance with the shape of the liquid supply part 23.

Thereby, it becomes possible to manufacture the liquid supply part 23 at a lower cost than the cylindrical liquid supply part 23 from the viewpoint of die cutting. That is, with the liquid supply part 23 according to the present embodiment, the bubble 51 and the foreign substance 52 can be captured with a more inexpensive configuration.

Note that, although the cross section of the liquid supply part 23 is a quadrangle in the example of the present embodiment, the cross section of the liquid supply part 23 may be formed to be a triangle or to be a pentagon. That is, it is sufficient as long as the cross-sectional shape of the liquid supply part 23 is polygonal. Needless to say, the shape of the walls is appropriately changed according to the cross-sectional shape of the liquid supply part 23.

Tenth Embodiment

In the present embodiment, the object is to capture the bubble 51 and the foreign substance 52 with a more inexpensive configuration. Although the liquid supply part 23 according to the fifth embodiment is cylindrical, the liquid supply part 23 according to the present embodiment is different from the liquid supply part 23 according to the fifth embodiment in the aspect of having a rectangular tubular shape. The following explanation focuses on the aspects that are different from the fifth embodiment, and the same configurations as those of the fifth embodiment are assigned with the same signs and the explanations thereof are omitted.

Figure 12:
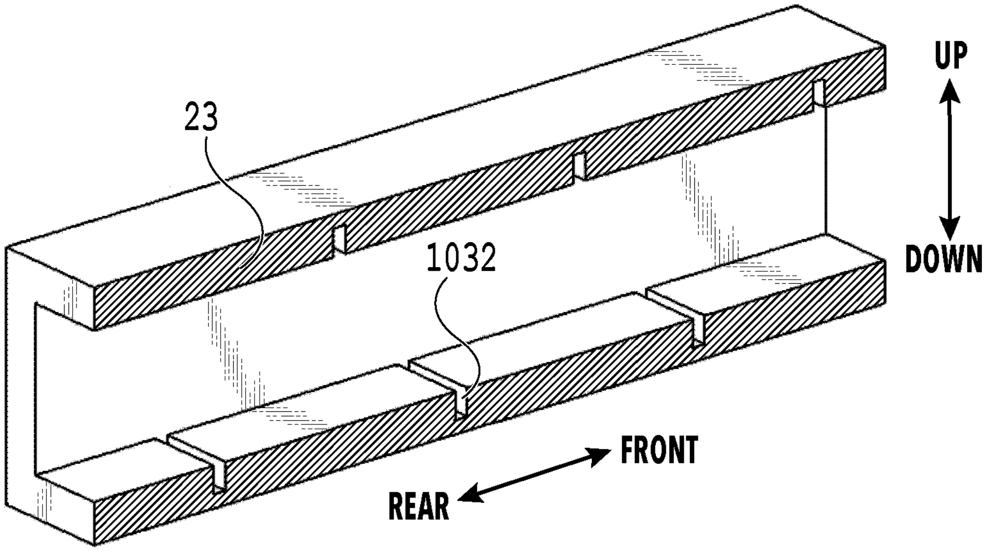
FIG. 12 is a perspective cross-sectional view illustrating the internal structure of a liquid supply part which configures a liquid container shown in the tenth embodiment.

FIG. 12 is a conceptual diagram illustrating the inside of the liquid supply part 23 according to the present embodiment. As illustrated in FIG. 12, the liquid supply part 23 according to the present embodiment has a rectangular tubular shape. Further, the grooves as the tenth capturing units 1032 are formed on the lower surface and the upper surface of the rectangular tubular liquid supply part 23 in accordance with the shape of the liquid supply part 23.

Accordingly, the bubble 51 and the foreign substance 52 can be captured by simply making a notch inside the peripheral wall of the rectangular tubular liquid supply part 23. That is, with the liquid supply part 23 according to the present embodiment, the bubble 51 and the foreign substance 52 can be captured with a more inexpensive configuration.

Eleventh Embodiment

In the present embodiment, the object is to improve the catchability of the bubble 51 and the foreign substance 52 while adopting an inexpensive configuration. Although the liquid supply part 23 according to the eighth embodiment is cylindrical, the liquid supply part 23 according to the present embodiment is different from the liquid supply part 23 according to the eighth embodiment in the aspect of having a rectangular tubular shape. Further, although the shape of the eighth wall part 831 is a semicircular shape in accordance with the cylindrical shape made by joining the half-split bodies of the liquid supply part 23 to each other, the present embodiment is different in the aspect that the shape is polygonal in accordance with the rectangular shape of the liquid supply part 23. The following explanation focuses on the aspects that are different from the eighth embodiment, and the same configurations as those of the eighth embodiment are assigned with the same signs and the explanations thereof are omitted.

Figure 13:
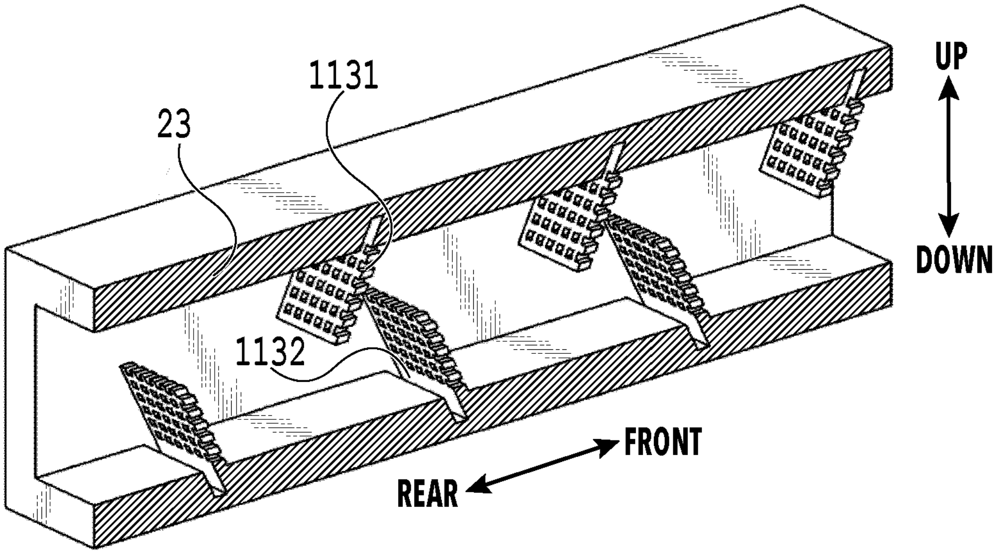
FIG. 13 is a perspective cross-sectional view illustrating the internal structure of a liquid supply part which configures a liquid container shown in the eleventh embodiment.

FIG. 13 is a conceptual diagram illustrating the inside of the liquid supply part 23 according to the present embodiment. As illustrated in FIG. 13, the shape of the liquid supply part 23 according to the present embodiment has a rectangular tubular shape. Thereby, it becomes possible to manufacture the liquid supply part 23 at a lower cost from the viewpoint of die cutting, as compared with a case in which the shape of the liquid supply part 23 is cylindrical.

Further, on the lower surface and the upper surface inside the peripheral wall of the liquid supply part 23, the eleventh wall part 1131 and the eleventh groove part 1132 of the eleventh capturing unit are formed so as to be inclined from the front to the rear in the direction in which the liquid flows. That is, the eleventh wall part 1131 and the eleventh groove part 1132 are formed so as to be inclined in the direction opposite to the direction in which the liquid flows.

Thereby, it becomes easier to capture the bubble 51 and the foreign substance 52, as compared with a case in which a wall and a groove are formed in a direction approximately perpendicular to the direction in which the liquid flows. Therefore, with the eleventh wall part 1131 and the eleventh groove part 1132 according to the present embodiment, it is possible to improve the catchability of the bubble 51 and the foreign substance 52 while adopting an inexpensive configuration.

Comparative Example

Hereinafter, the techniques of the present disclosure will be explained in more detail with reference to a specific comparative example and exemplary embodiments. The following explanation focuses on the aspects that are different from the first embodiment, and the same configurations as those of the first embodiment are assigned with the same signs so that the explanations thereof are omitted.

Figure 14A:
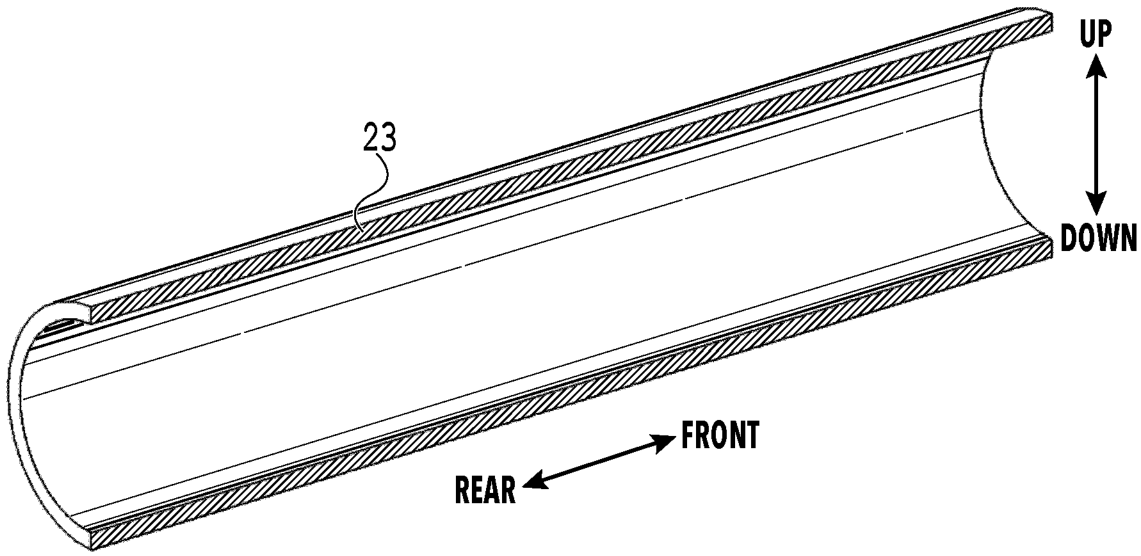
FIG. 14A is a perspective cross-sectional view illustrating the internal structure of a liquid supply part which configures a liquid container shown in the comparative example.
Figure 14B:
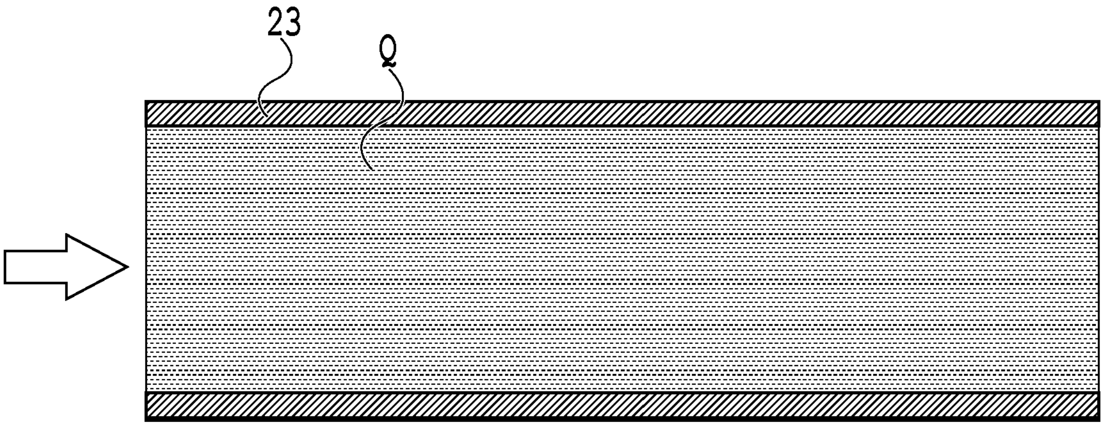
FIG. 14B is the cross-sectional view thereof.

In the present comparative example, the liquid container 20 having no capturing unit for capturing the bubble 51 and the foreign substance 52 was created. FIG. 14A and FIG. 14B are conceptual diagrams illustrating the liquid supply part 23 according to the present comparative example. FIG. 14A is a conceptual diagram schematically illustrating the left half of the liquid supply part 23 with respect to the direction in which the liquid flows. Further, FIG. 14B is a schematic cross-sectional view of the liquid supply part 23.

As the bag body 21 according to the present comparative example, one having a width (length in the left-right direction) of 60 mm and a depth (length in the front-rear direction) of 200 mm was prepared. Further, as the adapter 22 according to the present comparative example, one having a width of 76 mm, a depth of 40 mm, and a height (length in the up-down direction) of 20 mm was prepared.

Further, as the liquid supply part 23 according to the present comparative example, one having an inner diameter of 6 mm, a wall thickness of 1 mm, a depth of 100 mm, and no groove or wall formed inside was prepared.

Liquid blended with the bubble 51 and the foreign substance 52 was sealed in the bag body 21 of the liquid container 20 created as described above, and the liquid was all extracted from the liquid supply part 23. Then, it was confirmed that the bubble 51 and the foreign substance 52 were still contained in the extracted liquid.

Example 1

In the present exemplary embodiment, the exemplary embodiment of the above-described first embodiment will be explained. In the present exemplary embodiment, the same bag body 21 and adapter 22 as those in the above-described comparative example were prepared. Further, as the liquid supply part 23, one having an inner diameter of 6 mm, a wall thickness of 1 mm, and a depth of 100 mm was prepared. Inside the peripheral wall of the liquid supply part 23, the capturing units 131 in a semicircular shape having a diameter of 6 mm and a thickness of 1 mm were alternately formed in upper and lower positions at intervals of 5 mm with respect to the direction of the flow of the liquid Q.

Liquid blended with the bubble 51 and the foreign substance 52 was sealed in the bag body 21 of the liquid container 20 according to the present exemplary embodiment created as described above, and the liquid derived from the liquid deriving port 23*a* was all extracted via the liquid supply part 23. In this case, it was confirmed that the extracted liquid did not contain the bubble 51 and the foreign substance 52.

Exemplary Embodiment 2

In the present exemplary embodiment, the exemplary embodiment of the above-described fifth embodiment will be explained. In the present exemplary embodiment, the same bag body 21 and adapter 22 as those in the above-described comparative example were prepared. Further, as the liquid supply part 23, one having an inner diameter of 6 mm, a wall thickness of 3 mm, and a depth of 100 mm was prepared. Further, inside the liquid supply part 23, the grooves in a semicircular shape having a depth of 1 mm and a deepness of 2 mm were alternately formed in upper and lower positions at intervals of 5 mm with respect to the direction of the flow.

Liquid blended with the bubble 51 and the foreign substance 52 was sealed in the bag body 21 of the liquid container 20 according to the present exemplary embodiment created as described above, and the liquid derived from the liquid deriving port 23*a* was all extracted via the liquid supply part 23. In this case, it was confirmed that the extracted liquid did not contain the bubble 51 and the foreign substance 52.

Exemplary Embodiment 3

In the present exemplary embodiment, the exemplary embodiment of the above-described eighth embodiment will be explained. In the present exemplary embodiment, the same bag body 21 and adapter 22 as those in the above-described comparative example were prepared. Further, as the liquid supply part 23, one having an inner diameter of 6 mm, a wall thickness of 3 mm, and a depth of 100 mm was prepared.

Inside the liquid supply part 23, the semi-elliptical mesh-like (line diameter: 0.25 mm/pitch: 0.25 mm) walls whose crown part is inclined at 30 degrees with respect to the peripheral wall of the liquid supply part 23 in the direction opposite to the direction in which the liquid flows were alternately formed in upper and lower positions at intervals of 5 mm in the direction of the flow. Further, on the upstream side of the walls, the grooves having a depth of 1 mm and a deepness of 2 mm were formed so as to be adjacent to the walls, respectively.

Liquid blended with the bubble 51 and the foreign substance 52 was sealed in the bag body 21 of the liquid container 20 created as described above, and the liquid derived from the liquid deriving port 23*a* was all extracted via the liquid supply part 23. In this case, it was confirmed that the extracted liquid did not contain the bubble 51 and the foreign substance 52. Further, the same processes were performed with use of the pigment ink as the liquid. Then, it was confirmed that the bubble 51 and the foreign substance 52 could be captured without impairing the function as the pigment ink.

Other Embodiments

Although the preferred embodiments of the liquid container 20 according to the present disclosure has been explained, the liquid container 20 according to the present disclosure is not limited to these embodiments, and various modifications and changes can be made within the scope of the gist thereof. The above-described changes in accordance with the essence of the present disclosure are not prevented.

Although the liquid containing unit 10 supplies ink to the liquid ejection apparatus 1 in the explanation of the first embodiment, the use application of the liquid containing unit 10 is not limited to this. The liquid containing unit 10 of the present disclosure can also be used in various liquid ejection apparatus for ejecting liquids other than ink, for example. Note that the term "liquid" as used herein includes not only materials in a liquid phase state but also those in which particles of a functional material made of solid bodies such as pigments and metal particles are dissolved, dispersed or blended in a solvent, and typical examples thereof include liquid crystal and the like other than ink.

The term "ink" as used herein is one in which a pigment as a precipitation component is dispersed in a solvent and includes various liquid compositions such as gel ink and hot melt ink in addition to general aqueous inks and oil-based inks.

In the first embodiment, as an example of the order in which the capturing units 131 are formed, the example in which the capturing units 131 are alternately formed on the upper surface and the lower surface inside the peripheral wall of the liquid supply part 23 with respect to the direction in which the liquid flows. As another example of the order in which the capturing units 131 are formed, it is also possible that the capturing unit 131 is formed in a partial section of the longitudinal direction in the liquid supply part 23.

For example, in a view from the rear side of the liquid supply part 23, it is also possible that the second wall part 131*b* is formed as the first wall, the first wall part 131*a* is formed as the second wall, and the first wall part 131*a* that is different from the first wall part 131*a* used as the second wall is formed as the third wall. Needless to say, even in a case where a wall according to another embodiment is formed, the wall may be formed in a partial section of the longitudinal direction in the liquid supply part 23.

Further, even in a case where a groove according to the seventh embodiment is formed, the fifth capturing unit 532 may be formed in a partial section of the longitudinal direction in the liquid supply part 23. Furthermore, even in a case where a groove according to another embodiment is formed, the groove may be formed in a partial section of the longitudinal direction in the liquid supply part 23.

Although the capturing unit 131 is formed on the upper surface and the lower surface inside the peripheral wall of the liquid supply part 23 in the first embodiment, the capturing unit 131 may be formed only on the upper surface or on the lower surface depending on the use application. For example, in a case where it is desired to mainly capture the bubble 51 which has a lighter specific density than the liquid, only the first wall part 131*a* may be formed only on the upper surface, and, in a case where it is desired to mainly capture the foreign substance 52 which has a heavier specific gravity than the liquid, only the second wall part 131*b* may be formed.

Although grooves are not formed inside the peripheral wall of the liquid supply part 23 in the first embodiment, it is also possible that a groove as a capturing unit is formed in addition to the capturing unit 131. For example, it is also possible that a groove adjacent to the capturing unit 131 is formed on the rear side of the capturing unit 131 (on the front side with respect to the direction in which the liquid Q flows). That is, it is also possible that a groove, which is formed in a direction approximately perpendicular to the direction in which the liquid flows so as to be adjacent to the wall that is formed in a direction approximately perpendicular to the direction in which the liquid flows, is formed inside the liquid supply part 23.

Although the example in which the mesh-like holes are formed in the fourth capturing unit 431 is shown in the fourth embodiment, an example in which at least one or more recesses are formed in the capturing unit 131 according to the first embodiment can be taken as another example. Note that, in the aspect of capturing the bubble 51 and the foreign substance 52, it is preferable that multiple regularly-arranged recesses are formed.

For example, in a case where a dimple-like recess is formed in the capturing unit 131, the bubble 51 and the foreign substance 52 can be captured by the recess, and thus the bubble 51 and the foreign substance 52 are captured more effectively than a case where the surface of the capturing unit 131 is flat. Needless to say, it is also possible that a dimple-like recess is formed on the surface of the eighth wall part 831 without making mesh-like holes in the eighth wall part 831 according to the eighth embodiment.

Further, although the eighth wall part 831 according to the eighth embodiment is inclined in the direction opposite to the direction of the flow of the liquid Q, it is also possible that the eighth wall part 831 is formed so as to be approximately perpendicular to the direction of the flow of the liquid Q. Further, although a slope for facilitating the flow of the liquid Q is not formed in front of the eighth wall part 831, it is also possible that a slope is formed as in the third embodiment.

Further, although the eighth groove part 832 is inclined in the direction opposite to the direction of the flow of the liquid Q, it is also possible that the eighth wall part 831 is formed so as to be approximately perpendicular to the direction of the flow of the liquid Q as in the fifth embodiment. Further, it is also possible that the eighth groove part 832 is formed inside the peripheral wall of the liquid supply part 23 so as to increase the diameter from the inside toward the outside of the periphery as in the seventh embodiment. That is, it is also possible that the shape of the eighth groove part 832 is a keyhole shape.

According to a liquid container of the present disclosure, it is possible to prevent bubbles and foreign substances from being mixed in a liquid ejection apparatus with a simple configuration.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-132339, filed, Aug. 16 2021 which is hereby incorporated by reference herein in its entirety.

What is claimed is:

1. A liquid container for containing liquid to be ejected by a liquid ejection apparatus, the liquid container comprising:
a bag body configured to contain the liquid inside; and
a flow path for supplying the liquid contained inside the bag body to the liquid ejection apparatus,
wherein, inside a peripheral wall of the flow path, a first capturing unit extending in an anti-gravitational direction and a second capturing unit extending in a gravitational direction are arranged at different positions with respect to a direction in which the liquid flows.

2. The liquid container according to claim 1,
wherein the first capturing unit and the second capturing unit are alternately arranged with respect to the direction in which the liquid flows inside the flow path.

3. The liquid container according to claim 1,
wherein the first capturing unit and the second capturing unit include a wall extending in an approximately perpendicular direction from the peripheral wall of the flow path toward the inside of the flow path.

4. The liquid container according to claim 1,
wherein, regarding each of the first capturing unit and the second capturing unit, an acute angle is formed with a surface that receives a flow of the liquid that flows in the flow path and the peripheral wall of the flow path.

5. The liquid container according to claim 1,
wherein each of the first capturing unit and the second capturing unit includes:
a wall surface extending from the peripheral wall of the flow path toward the internal center of the flow path in an approximately perpendicular direction; and
a slope surface extending from the peripheral wall of the flow path toward the internal center of the flow path in a direction opposite to the direction in which the liquid flows.

6. The liquid container according to claim 1,
wherein the first capturing unit and the second capturing unit have at least one or more holes.

7. The liquid container according to claim 1,
wherein the first capturing unit and the second capturing unit have at least one or more recesses.

8. The liquid container according to claim 1,
wherein the first capturing unit and the second capturing unit include a groove that is formed in the peripheral wall of the flow path.

9. The liquid container according to claim 8,
wherein the first capturing unit and the second capturing unit are formed by inclining a bottom surface part of the groove in a direction opposite to the flowing direction of the liquid that flows inside the flow path.

10. The liquid container according to claim 8,
wherein the first capturing unit and the second capturing unit include a groove whose diameter increases from the inner side toward the outer side of the peripheral wall of the flow path.

11. The liquid container according to claim 1,
wherein the first capturing unit includes a wall that is formed on an upper part inside the peripheral wall of the flow path and a groove adjacent to the wall, and
wherein the second capturing unit includes a wall that is formed on a lower part inside the peripheral wall of the flow path and a groove adjacent to the wall.

12. The liquid container according to claim 1,
wherein the flow path has a cylindrical shape.

13. The liquid container according to claim 1,
wherein the flow path has a rectangular tubular shape.

* * * * *